United States Patent [19]
Kirsch

[11] Patent Number: 5,963,915
[45] Date of Patent: Oct. 5, 1999

[54] SECURE, CONVENIENT AND EFFICIENT SYSTEM AND METHOD OF PERFORMING TRANS-INTERNET PURCHASE TRANSACTIONS

[75] Inventor: Steven T. Kirsch, Los Altos, Calif.

[73] Assignee: Infoseek Corporation, Sunnyvale, Calif.

[21] Appl. No.: 08/604,506

[22] Filed: Feb. 21, 1996

[51] Int. Cl.[6] .................................................. H04L 12/28
[52] U.S. Cl. ..................... 705/26; 705/27; 395/200.33; 395/200.47; 395/200.49
[58] Field of Search ................................ 705/17, 18, 26, 705/27; 395/200.33, 200.47, 200.49, 200.57, 200.61

[56] References Cited

U.S. PATENT DOCUMENTS

| | | | |
|---|---|---|---|
| 5,671,279 | 9/1997 | Elgamal | 380/23 |
| 5,710,887 | 1/1998 | Chelliah et al. | 395/226 |

*Primary Examiner*—Thomas R. Peeso
*Attorney, Agent, or Firm*—David E. Lovejoy

[57] ABSTRACT

A purchase transaction is performed between a client browser and a merchant server over a general access wide area connected network. The transaction appears to the client as singularly identifying a purchasable product or service and singularly confirming the purchase. A persistent predetermined coded identifier is established on the client browser corresponding to an account record stored by the merchant server. A predetermined URL referencing a purchasable product or service is served to the client browser. The predetermined URL includes an implicit reference to the persistent predetermined coded identifier. The predetermined URL is received by the merchant server, including the predetermined coded identifier, in response to a client browser selection. The merchant server validates the predetermined coded identifier against the account record and records an identifier of the purchasable product or service as derived from the predetermined URL by the merchant server.

22 Claims, 3 Drawing Sheets

SECURE, CONVENIENT AND EFFICIENT SYSTEM AND METHOD OF PERFORMING TRANS-INTERNET PURCHASE TRANSACTIONS

CROSS-REFERENCE TO RELATED APPLICATIONS

The present application is related to the following Application, assigned to the Assignee of the present Application:

1) Method & Apparatus for Redirection of Server External Hyperlink References, invented by Kirsch, [Attorney Docket Number: INFS1004DEL/GBR], application Ser. No. 08/604,468, filed concurrently herewith, and
2) IMPROVED WEB SCAN PROCESS, invented by Kirsch, [Attorney Docket Number: INFS1003DEL/GBR], application Ser. No. 08/604,584, filed concurrently herewith.

BACKGROUND OF THE INVENTION

1. Field of the Invention

The present invention is generally related to systems of performing commercial activities over a general access computer network and, in particular, to a system and method of conveniently and efficiently performing advertising responsive secure commercial purchase transactions over the Internet utilizing the World Wide Web.

2. Description of the Related Art

During the past few years, there has been a substantial growth in the quantity and diversity of information and services available over the Internet. The number of users of the Internet has similarly grown quite rapidly. Perhaps one if not the predominant area of growth on the Internet has been in the use of the World Wide Web, often referred to as WWW, W3, or simply "the Web." The hyper-text transfer protocol (HTTP) that serves as the foundation protocol for the Web has been widely adopted and multiply implemented in Web browsers and Web servers. Web browsers provide a convenient user application for receiving generally high quality text and graphical based information in a scrollable display page format. Such Web pages are related by embedded hyper-text links that reference other Web pages. Selection of a hyper-text link, either by direct reference or implied reference through an image map, causes a hyper-text jump to the selection referenced Web page. Selection is generally through a simple, single mouse click on a displayed portion of the text or graphics. This system of simply selecting relations makes browsing successive Web pages served from potentially quite diverse and distant Web servers convenient and intuitive, and accounts in large part to the rapid and wide acceptance of the Web as an information resource.

One of the anticipated uses of the Web has been to provide a venue for commercial transactions in products and services. However, commercial use of the Web has distinctly not met the anticipated potential for a number of reasons. These reasons include security, convenience of use, and efficiency. Regarding security, current conventional Web browsers generally provide for the use of a reasonably secure encryption protocol overlaid on the HTTP protocol. The encryption protocol, typically involving a key-exchange based encryption algorithm, permits individual transactions over the Internet to be secure. Consequently, sensitive information, such as credit card numbers and the like, can be reasonably transferred over the Internet with little risk that the information can be misappropriated and misused.

An exemplary security system utilized by conventional HTTP browsers and servers is known as the secure sockets layer (SSL). The secure sockets layer defines and implements a protocol for providing data security layered under various application protocols, such as HTTP in particular, and over a conventional TCP/IP communications stack. The secure sockets layer protocol discretely provides the potential for data encryption, server authentication, message integrity, and client authentication for supported protocol connections over a TCP/IP connection. In use, the secure sockets layer is implemented at both the client browser and server ends of a network connection. A conventional uniform resource locator (URL), utilizing "https" as the secure HTTP protocol identifier, is issued by the client browser to specifically request a secure client/server session. A series of handshake transactions are provided to negotiate the establishment of the secure session including performing an encryption key exchange that is used in an encryption algorithm implemented by both the client-side and server-side secure sockets layers.

As part of this handshaking, the client browser may also retrieve the authentication certificate of the server for validation against a known certificate authority to ensure that the server is not an imposter. The secure HTTP protocol permits the server to also request and validate the authentication certificate, if any, held by the client. However, in general, client browsers and, more specifically, their client host computer systems are rarely registered with a publicly accessible authentication certificate authority. Thus, general use of client certificate authentication is not a viable means for identifying specific client users or client computer systems.

As a consequence, commercial use of the Web to sell products and services practically requires the establishment of a forms based user identification scheme, typically based on user name and password, by the server system to securely identify and re-identify a specific client user. Providing the user name and password to initiate each purchase session with a particular server is the minimum required to authenticate the client user. The underlying secure HTTP protocol session ensures that the user name and password are securely transmitted in an encrypted form over the Internet to the correct server. By the fundamental nature of the key exchange encryption algorithm used, only the server can decrypt to clear text the user name and password provided from the client browser.

A secure HTTP session may span a number of individual HTTP transactions between a client browser and server. With each of these individual transactions, the exchange keys are in effect permuted synchronously by both the browser and server to vary the encryption coding used for each transaction. However, each established secure HTTP session requires definite closure to prevent a security breach commonly known as a "third party assumption of identity attack." That is, a third party may be able to continue the secure session started by another client browser relative to the server. Since client user authentication only occurs at the initiation of the secure session, the third party fully assumes the authorization of the session initiating client browser.

Consequently, commercial transactions over the Internet conventionally requires three distinct phases in order to securely perform a purchase transaction. The first phase, conducted once a secure HTTP session is established, is a logon transaction where the client user provides a user name and password for authentication by the server. Once authenticated, a second or selection phase allows the client user to select products and services for purchase. The server system must in some way continually track and manage the selections made by the client. The server may record or log each selection against the client account as the selections are made. This second phase is therefore an extended transaction that is made up of many discrete HTTP transactions. Such an extended selection transaction is subject to failure for a variety of conventional reasons, including simply an extended delay in the selection process, resulting in an incomplete or incorrect record of partial purchase selections being kept by the server system. Without authoritative closure of the purchase transaction, the server system typically aborts the purchase and discards the record of selected items.

A facility known as persistent client-side cookies has been introduced to provide a way for server systems to store selected information on client systems. Cookies are created at the discretion of the server system in response to specific client URL requests. Part of the server response is a cookie consisting of a particularly formatted string of text including a cookie identifier, a cookie path, a server domain name and, optionally, an expiration date, and a secure marker. The cookie is automatically discarded by the client system based on the expiration date. If the secure marker is present, then the cookie is only returned to a server system during a secure transaction. Where a URL client request made by the client, the cookie paths and domain names of cookies stored by the client are compared with those of the URL request. Cookies with matching paths and domain names are passed with the client URL request to the server system. Any text associated with the identifier is also passed back to the server system. In Internet purchasing applications, the identifiers and associated text can be used to store information about the current purchase selections.

Finally, the third phase requires some action on part of the client user to initiate closure of the purchase transactions and secure session. Typically, the third phase is entered when the client user indicates that all product and service selections are complete. A summary order confirmation form is then presented by the server. The purchase transaction and the secure session are closed on acceptance or cancellation of the order as presented.

The convenience of conventional purchase transactions via the Internet, however, leaves much to be desired. Because of the security concerns, a secure purchase session is limited to encompassing a single vendor at a time due to the required three phase login, select, commit purchase protocol required to ensure the integrity of a secure purchase session. Not only is the three phase purchase transaction itself self-evidently cumbersome and thereby a limiting barrier to convenient use by client users, but many purchase may involve only a single purchasable item or some number of items that are available only from distinctly different vendors. Where the purchase transaction is only for a single item, the necessity of executing a complete three phase purchase protocol distinctly reduces the likelihood that a client user will actually bother to make the purchase. A greater barrier exists where the purchase transaction, from the client user's perspective, is of multiple items from multiple vendors. The necessity of completing independent three phase purchase transactions with each of the vendors, particularly where the purchased items are not entirely planned for or subject to comparative inter-dependant selection, presents a significant barrier to the client user conveniently and expediently making the purchase of products and services. The three phase purchase transaction is simply cumbersome and limiting and will become more so as products and services are more widely available from different vendors over the Web.

Another aspect of convenience relates to the speed at which purchase transactions can be performed and the efficiency of the vendors in fulfilling the order for products and services. The implicit requirement for a three phase purchase transaction is fundamentally slow due to the requirement of client user planning of the purchase transactions where products or services are to be procured from independent vendors and alternately by requiring a decision to purchase to be made prior to determining or selecting precisely what will be purchased.

In addition, the conventional three phase purchase transaction greatly limits the flexibility of different types of vendors from being able to deliver ordered products and services in their chosen most efficient manner. All products selected during a secure purchase session are, in effect, ordered from the single vendor regardless of whether another vendor might actually be the source of a product or service sold. The server vendor receives the entire order and must independently place orders with supporting vendors by conventional means. As an implicit result electronic catalog vendors, agent vendors, and order-clearinghouse type vendors are constrained to separately processing each and every ordered product or service to lower-tier vendors. Although an electronic catalog vendor, for example, might wish to have each lower-tier vendor directly fulfill their part of an order, the server vendor must itself discriminate which products are to be sourced by which lower-tier vendor and provide shipping and indirect billing information. In general, direct order fulfillment from multiple vendors, though the purchase transaction appears to be simply with the electronic catalogue vendor, would be significantly more efficient for both the end user and the involved vendors. Products and services would be shipped or provided sooner and with less opportunity for error, while ordered products and services are automatically processed through to the correct vendor with the correct billing and shipping information.

Consequently, there is a clear need for the ability to perform purchase transactions over the Internet that are secure, convenient and efficient both for a client user and the many different vendors of products and services available over the Internet.

SUMMARY OF THE INVENTION

Thus, a general purpose of the present invention is to provide a method of efficiently performing secure purchase transactions over the Internet.

This is achieved in the present invention by providing for a purchase transaction that appears to the client user as a singular selection of a purchasable product or service and a singular confirmation of the purchase. A persistent predetermined coded identifier is established on the client browser corresponding to an account record stored by the merchant server. A predetermined URL referencing a purchasable product or service is served to the client browser. The predetermined URL includes an implicit reference to the persistent predetermined coded identifier. The predetermined URL is received by the merchant server, including the predetermined coded identifier, in connection with a client browser selection. The merchant server validates the predetermined coded identifier against the server stored account record and records an identifier of the purchasable product or service as derived from the predetermined URL by the merchant server.

An advantage of the present invention is that essentially no redundant user input is required to stage and maintain a secure purchase transaction over the Internet.

Another advantage of the present invention is that a purchase selection URL may be embedded in widely distributed hyper-text documents served by merchant vendors, vendor agents, distributors, electronic catalogers and the like while maintaining both transaction identity and transaction security and affording substantial transaction efficiencies.

A further advantage of the present invention is that secure purchase transactions can be implemented for unsecure servers of sponsored products and services.

Yet another advantage of the present invention is that server side automation can provides for automatic simultaneous purchase transaction handling for both secure and unsecure client browsers.

Still another advantage of the present invention is that Internet purchases can be performed as essentially atomic purchase transactions over the Internet while maintaining security over the transaction without requiring a user authentication manually entered by a client user in circumstances where the client user has a pre-established credit relationship with a particular merchant vendor.

A still further advantage of the present invention is that additional levels of authentication and security, including usage of an optional personal identification number (PIN), restrictions on shipping destination, and e-mail confirmation of orders, can be readily and optionally added in a convenient manner determined on a per server basis.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein.

DETAILED DESCRIPTION OF THE INVENTION

Figure 1:
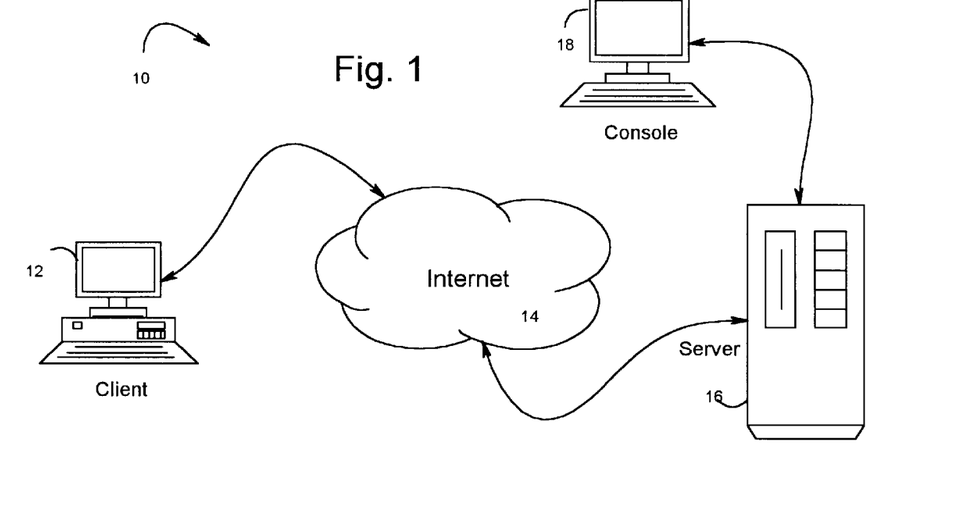
FIG. 1 illustrates a client/server system architecture providing for a hyper-text transfer protocol connection between client and server computer systems.

An Internet computer system 10 is generally illustrated in FIG. 1. A conventional client computer system 12, executing a client browser application that supports the HTTP protocol, is connected typically through an Internet Service Provider (ISP) to the Internet 14. A server computer system 16 is also coupled typically through an Internet Service Provider to the Internet 14. The server computer system 16, controlled by a local console 18, executes a Web server application conventionally known as a HTTPd server. In addition, the server computer system 16 preferably provides local storage for at least one, though typically many Web pages.

The client computer system requests a Web page by issuing a URL request through the Internet 14 to the server system 16. A URL consistent with the present invention may be a simple URL of the form:

<protocol_identifier>://<server_path >/<web_page_path>

A "protocol_identifier" of "http" specifies the conventional hyper-text transfer protocol. A URL request for a secure Internet transaction typically utilizes the secure protocol identifier "https," assuming that the client browser and Web server are presumed to support and implement the secure sockets layer. The "server_path" is typically of the form "prefix.domain," where the prefix is typically "www" to designate a Web server and the "domain" is the standard Internet sub-domain.top-level-domain of the server system 16. The optional "web_page_path" is provided to specifically identify a particular hyper-text page maintained by the Web server.

In response to a received URL identifying an existing Web page, the server system 16 returns the Web page, subject to the HTTP protocol, to the client computer system 12. This Web page typically incorporates both textural and graphical information including embedded hyper-text links that permit the client user to readily select a next URL for issuance to the Internet 14.

The URL issued from the client system 12 may also be of a complex form that identifies a common gateway interface (CGI) program on a server system 16. Such a HTML hyperlink reference is typically of the form:

<form action="http://www.vendor.com/cgi-bin/logon .cgi" method=post>

A hyper-text link of this form directs the execution of the logon.cgi program on an HTTP server in response to a client side selection of an hyperlink. A logon form supported by a logon CGI program is typically used to obtain a client user login name and password to initiate an authenticated session between the client browser and Web server for purposes of supporting, for example, a purchase transaction.

In accordance with the present invention, a more complex hyperlink URL providing for the autonomous redirection of a URL request to another server can also be used. The form of the redirection URL and the method use are disclosed in "Method and Apparatus for Redirection of Server External Hyperlink References," invented by Steven T. Kirsch (application Ser. No. 08/604,468) which is incorporated herein in its entirety by reference. In brief, the redirection URL is embedded in a Web page presented to the client system 12. On selection of a hyperlink coded with the redirection URL, the URL is transmitted via the Internet 14 to the server system 16. In a preferred embodiment, the embedded redirection URL is of the form:

http://<direct_server>/redirect?<data>?http://<redirect_server>

The "direct_server" portion of the redirection URL specifies the HTTP server target of a transaction that is to be initially established by the client system 12. The remaining information is provided to the targeted direct server. While the direct server may be any HTTP server accessible by the client system 12 that has been designated to service redirection requests, the direct server is preferably the server system 16 that initially served the Web page with the embedded redirection URL to the client system 12. The term "redirect" in the embedded redirection URL is a key word that is detected by the server system 16 to specify that the URL issued to the server 16 corresponds to a redirection request.

The "data" term of the redirection URL provides data to the HTTPd server executed by the server system 16 to identify the source instance of the selected hyperlink and potentially to further validate the redirection URL as presented to the HTTPd server on the server system 16.

The final portion of the redirection URL is a second URL. This second URL identifies directly the target server system for the redirection. Preferably, any path portion provided as part of the direct server specification with a redirection URL is repeated as a path component of the redirect server portion of the redirection URL. However, path portion identity is not required. In general, all that is required is a one-to-one correspondence between the Web pages referenced by the direct server and redirect server terms of the redirection URL.

On recognition of the redirect key word, the second URL in the redirection URL is returned to the browser executing on the client system 12 as part of a redirection message that directs the browser to issue a new URL request consisting essentially of the second URL. As a result, the "data" portion of the direct URL is effectively delivered to the direct server for purposes of accounting and potentially also validation, while the second URL is issued to the redirect server essentially transparently to the client user.

Figure 2:
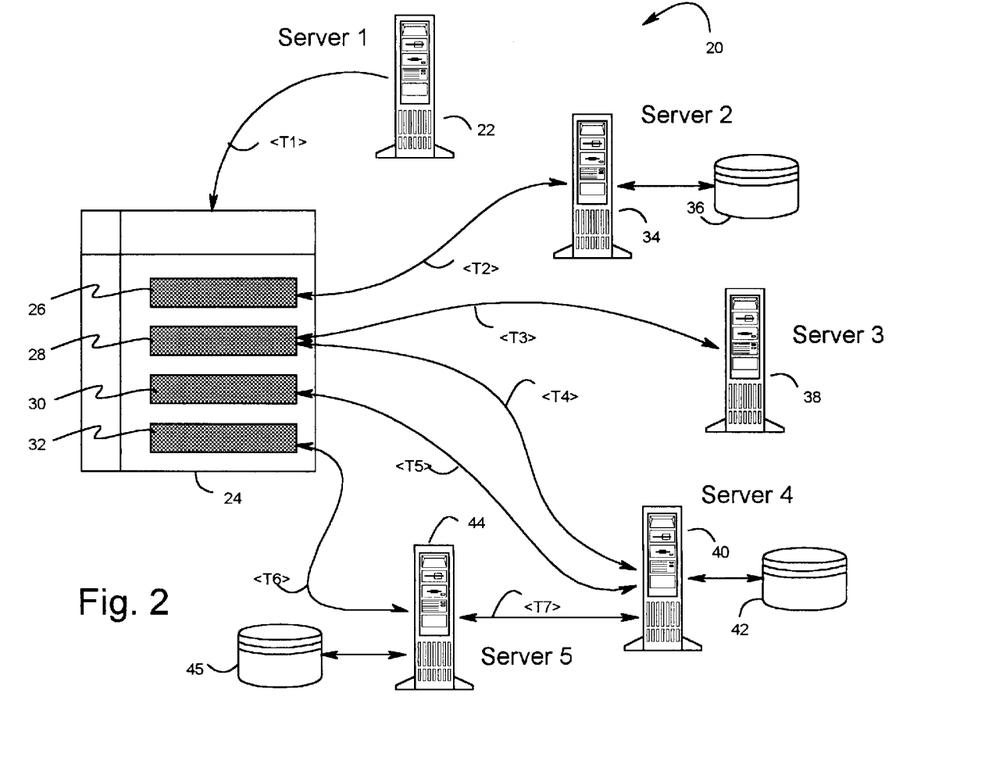
FIG. 2 illustrates a variety of purchase transaction scenarios based on a selection of goods or services to be purchased from an electronic catalog Web page.

Referring now to FIG. 2 a number of different scenarios are presented where the present invention is utilized in simple to complex purchase transactions that, at least from a client user's perspective, are all equally secure and convenient. Each, from the merchant vendor's perspective, is also quite efficient. In a first scenario, a Server-1 22 serves a Web page 24 to a client browser in response to a URL request/Web page service transaction T1. The Web page 24 may embed any number of hyperlinks including for example hyperlinks 26, 28, 30, 32. The hyperlink 26 may represent a direct reference to an embedded URL or an active image map that can be utilized to ultimately resolve a client user selection on a discrete portion of a displayed graphic to a specific URL. The image map representation can thus be utilized to provide multiple selectable choices regarding one or more products or services graphically depicted by the hyperlink 26. These different but related URLS preferably allow the client user to separately request further information about the indicated product or service, information regarding other related products and services, information regarding the availability, method of shipment and terms of purchase for the indicated product or service, and to directly issue a request to purchase the product or service.

Where the selection reflects a request for further information, an image map selection identifier is passed as part of a transaction T2 to a vendor Server-2 34. The Server-2 34 can be the same logical or physical server as Server-1 22 or a completely independent server. The requested information is returned to the client browser as part of the transaction T2 preferably in the form of a Web page. Where the image map selection is resolved to a request to purchase URL, the present invention preferably provides for the purchase URL to specify use of a secure HTTP session with the Server-2 34. In accordance with the secure protocol, such as implemented by the secure sockets layer, the Server-2 34 negotiates and establishes a secure session T2 with the client browser. Once the secure session is established, the purchase request URL is, at least in effect, issued to vendor Server-2 34. Any client-side stored cookie data that properly corresponds to the request URL is also passed to the Server-2 34. In the preferred instance where an authenticated credit relationship has been pre-established between the client user and the Server-2 34, the client-side cookie encodes information sufficient to re-authenticate the client user to the Server-2 34. Where a client/vendor credit relationship has not been pre-established, a corresponding cookie will not exist on the client system 12. In this case, the Server-2 34 may initiate a conventional process of establishing and validating a credit relationship with the client user. Preferably, the Server-2 provides a registration form to the client browser for display and completion by the client user as part of the secure transaction T2. The registration form typically provides for the entry of a name, a password, a credit card number, billing and shipping addresses for the client user and possibly other relevant information. The resulting information is used by the Server-2 34, in accordance with the present invention, to create and store a client-side cookie on the client system 12 for use in connection with a subsequent URL purchase request. A database record is also preferably created in the database 36.

Cookie data, when received by the Server-2 34 in connection with a purchase request URL, is then used to lookup a client database record in the database 36. The cookie data may be decoded and compared with the record contents to validate the cookie. Assuming that the comparison is correct, the identified record is then used as the source of billing related information, needed by the Server-2 34 to fulfill the client user's purchase request.

When the decoded cookie information becomes available to the Server-2 34, directly as part of the secure transaction T2 or indirectly from form entered data, the Server-2 34 may then perform an automated credit extension authorization check to ensure that sufficient credit exists and may be extended to cover the present purchase transaction. Again assuming sufficient credit is available, the purchase of the product or service identified by the selected URL 26 can be presented to the client user for approval using a purchase confirmation form identifying the selected product or service, the billing and shipping related information, and provide active confirm and cancel buttons.

In an alternate embodiment, each purchasable item listed on the confirmation form is also presented with individual confirm, cancel and defer buttons. Deferred purchasable products and services are accumulated by the Server-2 34 and presented with subsequent confirmation forms generally until the product or service purchase is approved, cancelled or expired. Additional authentication and security options may be added through the operation of the confirmation form. These further options are discussed below in relation to FIG. 4.

The data provided by the client user in response to the confirmation form is preferably returned to the Server-2 34 and may terminate the secure session portion of the HTTP transaction T2. The purchase of the product or service, if accepted by the client user, is then a sales order that can then be processed by the Server-2 34 or passed on to an automated order processing system for order fulfillment consistent with conventional order processing practices to provide for the delivery of the product or service purchased to the client user.

Thereafter, should the client user again select the purchase portion of the hyperlink image map 26, or any other purchase selection hyperlink that corresponds to the same vendor operating from the Server-2 34, a new secure session T2 is established, the client-side cookie is provided to the Server-2 34, and a confirmation form is presented to the client user. The client-side cookie provided during the secure session T2 specifically encodes sufficient information to authenticate the client user to the Server-2 34, thereby obviating the need for the client user to re-authenticate manually.

As should now be appreciated, once a purchase relationship has been established between a client user and vendor server, subsequent purchase transactions in accordance with the present invention consist simply of a product or service selection phase followed by a confirmation phase where each phase requires nothing more than a single mouse click to complete.

Selection of, for example, a direct hyperlink URL 28 on the Web page 24 results in the issuance of a URL request initiating a transaction T3 with a Server-3 38. Although, in this scenario, Server-3 38 is the direct sponsor of the URL 28 on the Web page 24 served by the Server-1 22, the Server-3 38 may not wish to or be able to participate in a secure purchase transaction. However, as the sponsor of the URL 28, Server-3 38 may require preemptive notification of the selection of the URL 28. Accordingly, the URL 28 may be provided on the Web page 24 as a redirection URL that identifies a Server-4 40 as the second URL within the redirection URL 28. Where the Server-3 38 implements the secure sockets layer, the initial URL reference to the Server-3 38 may provide for a secure session within the transaction T3. Consequently, any and all data provided as part of the redirection URL for accounting purposes to the Server-3 38 is encrypted by operation of the secure transaction T3.

However, Server-3 38 need not and often will not be a secure server. The accounting data provided with the redirection URL will typically not be of a sensitive nature. Generally, the accounting data will provide an identification of the particular instance of the URL 28 that was selected by a client user. Furthermore, any client-side cookie corresponding to the initial URL or the redirection URL will also not contain any sensitive account or billing information relevant to the actual product or service identified by the URL 28. Rather, the cookie containing the sensitive information will be transferred only to the Server-4 40 within a secure session transaction T4.

The Server-3 38 returns a redirection message and the second URL to the client browser. As in the case of the purchase URL provided to the Server-2 34, the second URL of the redirection URL preferably specifies a secure protocol, such as "https," a specific Web server, such as Server-4 40, and includes a Web page path that can be used to identify a particular product or service. Thus, in response to the redirection message from Server-3 38, the client browser preferably autonomously operates to establish a secure session transaction T4 with the Server-4 40. The sensitive data provided by the client-side cookie that is selected specifically by the second URL of the redirection URL is therefore passed to the Server-4 40 within the secure session transaction T4. The secure purchase transaction T4 then completes in the same manner as described above with regard to transaction T2.

Consequently, by the ability to use a redirection URL as the URL 28 the present invention readily supports the qualified use of unsecure Web servers and provides a basic flexibility useful for Web servers that choose to act only as URL sponsors, or product agents. That is, the present invention directly supports merchant vendors who wish to, at least in effect, contract out the actual server side execution of an Internet purchase transaction. Utilization of the redirection URL permits the purchase transaction T3 to be directed to a specific purchase transaction processing Server-4 40 while ensuring that notice is provided to the Server-3 38 with each selection of the redirection URL 28.

The use of the redirection URL allows any number of URL sponsoring Web servers to utilize the services of the Server-4 40. The support of redirected purchase transactions by Server-4 40, however, does not preclude the Server-4 40 from directly supporting purchase transactions, such as within a secure session transaction T5 initiated in response to the selection of a directly hyperlinked URL 30. Thus, the present invention provides substantial flexibility in the use of primary purchase transaction Web servers such as Server-4 40.

Another form of indirection consistent with the present invention is demonstrated by a Server-5 44 in connection with the sponsorship of a hyperlink 32. Again, as implemented on the Web page 20, the hyperlink 32 may represent multiple URLs separately selectable through an image map. The hyperlink 32 may also represent one or more separately selectable direct URLs. In both instances, at least one selectable URL represents a request to purchase a product. Other URLs may represent requests for various types of product related information.

Selection of a URL 32 preferably results in the establishment of a transaction T6 with the Server-5 44. Although the Server-5 44 may be a secure server and preferably maintains a database 45 of client user account records and Web pages detailing certain products and services available for apparently direct purchase, the Server-5 44 may itself maintain pre-established credit relationships with any number of other servers, such as Server-4 40. In response to a URL request for product information or to purchase a selected product, the Server-5 44 may establish a transaction T7 with the Server-4 40. This transaction T7 may be an HTTP or possibly a non-HTTP transaction, such as a network filesystem read (NFS) or custom remote procedure call (RPC), that serves to retrieve responsive information from the Server-4 40, preferably as or suitable for incorporation in a Web page that is responsively served to the client user.

The transaction T7 may also represent a secure purchase transaction in accordance with the present invention. In this instance, the Server-5 44 acts as a product purchaser relative to the Server-4 40 and purchases based on a credit relationship pre-established between the Server-5 44 and the Server-4 40. The referenced account record held in the database 42 by Server-4 may be used to specifically identify the Server-5 44 as a possibly re-branding reseller of products purchased from Server-4 40. Accordingly, after so identifying Server-5 44, the Server-4 40 may issue an HTTP request to Server-5 44 to obtain the drop ship address of the ultimately purchasing client user and, potentially, the brand identification to be applied to the product upon shipping. Alternately, though perhaps less efficient, the purchased product can be shipped to Server-5 44 for reshipment to the client user.

The present invention therefore provides a fundamental flexibility that allows the Server-5 44 to act as an electronic catalog distributor, a retail specialty or department store vendor, a service permitting indirect purchases by the client user, a search service that catalogues many if not all available sources of a product or service available over the Internet 14, or any combination of roles. In the instance where the Server-5 44 is acting as a product or service search engine, the scan of the Internet for particular products and services may be performed preemptively by the Server-5 44 or performed specifically in response to the product selection URL 32. By requesting relevant information from each source server, such as Server-4 40, the Server-5 44 may be able to identify a source of the requested product or service at the best price and availability within parameters for each that might be specified by the client user.

In any event, where the Server-5 44, in response to a secure purchase transaction request T6, has identified the selected product or service as being available through Server-4 40, the Server-5 44 operates as a proxy for the client user and relays through a secure purchase transaction T7 the purchase request initiated by the client user. This will require the client user to have or to establish a credit relationship with the Server-4 40.

Alternately, the Server-5 44 may directly respond to the client user selection URL 32 by performing a secure purchase transaction T6. On confirmation of the purchase selection by the client user, the Server-5 44 may initiate an independent purchase transaction T7 with the Server-4 40. Consequently, the full range of flexibility in the utilization of the present invention is maintained in scenarios involving the interposition of the Server-5 44 in the secure purchase transaction path. Notably, in essentially all instances, the entire purchase transaction from the client user perspective remains a simple two phase operation requiring at most only two mouse clicks for complete execution of the purchase.

Figure 3:
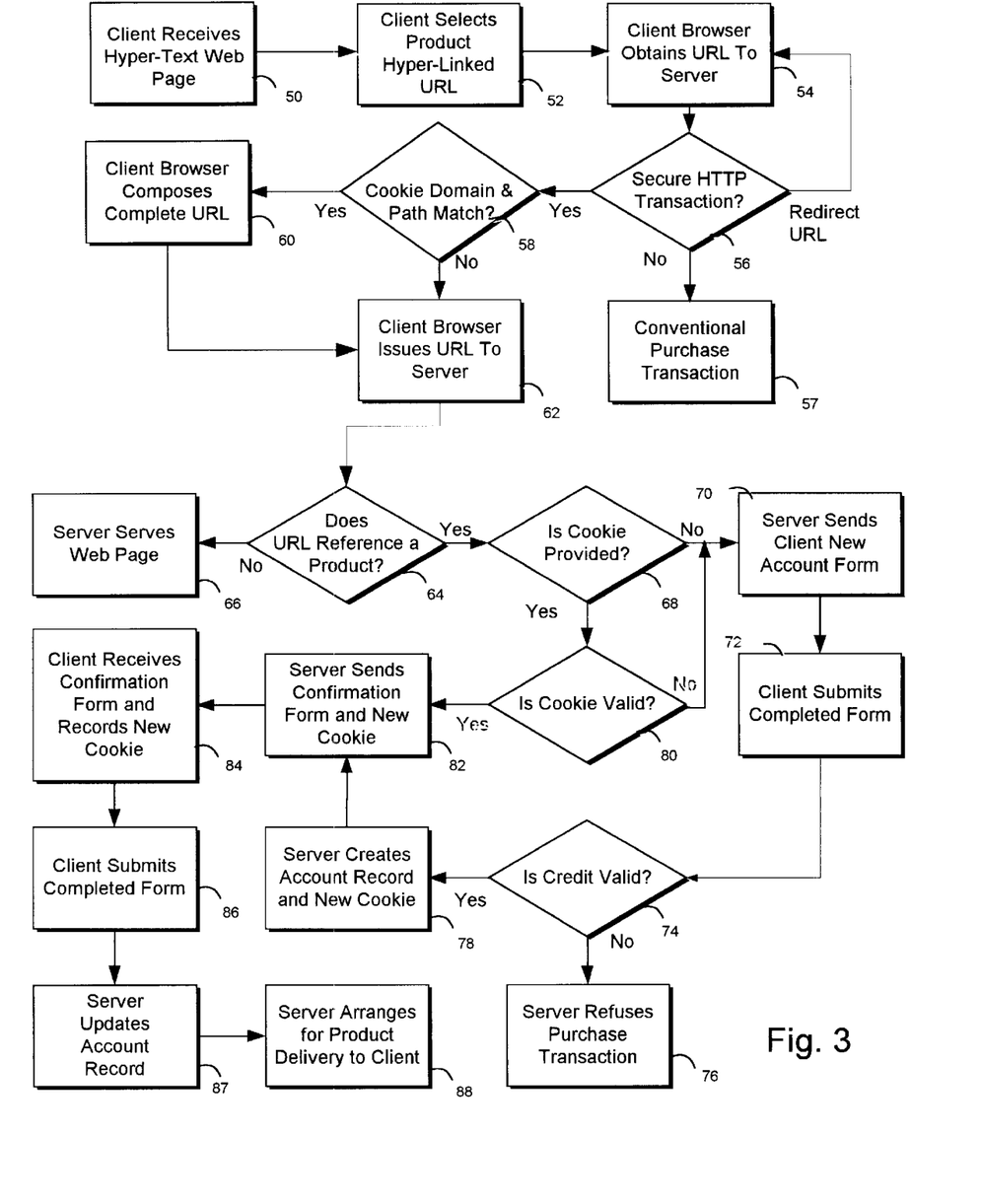
FIG. 3 is a flow diagram of the process of performing a client purchase in accordance with the present invention.

FIG. 3 provides a detailed flow diagram illustrating the operation of the present invention in the purchase of a product over the Internet 14. Initially, the client browser receives a Web page 50 having any number of embedded URLs, either directly or through an indirect reference provided by an image map. The client user selects 52 a product from the Web page for purchase. The client browser ascertains 54 the corresponding URL. Preferably, this product reference URL specifies a request for a secure HTTP transaction. If a secure transaction 56 can be established with the server specified by the product URL, the client browser will autonomously determine whether a cookie having a matching domain and path reference exists on the client system 12. In accordance with the present invention, such a cookie will be marked secure, to prevent transmission in unsecure transactions, and provided with a vendor defined expiration date, to force re-establishment of a credit relationship for inactive client users. If a cookie is found with a matching domain and path 58 the client browser adds the corresponding cookie data to the HTTP URL request message 60 that then is issued to the URL specified server 62. If a cookie is not found or has expired, the URL request message without a cookie is sent to the URL specified server 62.

A secure HTTP transaction will typically not be specified by the first URL of a redirection URL. Consequently, the redirection URL is issued to the sponsor server and a redirection message and second URL will be returned to the client browser 54. Preferably, the second URL specifies a secure transaction request and a server that can support secure transactions.

Alternately, the URL referenced server may refuse or fail the negotiation for a secure transaction with the client browser. In this case, the purchase transaction must be refused or proceed to be handled by the client browser and server in a conventional unsecure manner 57. However, since any cookie stored by the client browser for the referenced server and path is marked secure, the cookie is not sent by the client browser as part of any unsecure HTTP transaction with the URL referenced server.

In accordance with the present invention, the a secure URL referencing a product for purchase is preferably of one of two forms. The first form provides for the execution of a CGI program on the server system 16 to implement the server side operation of the present invention. An exemplary URL conforming to the present invention could be:

https://www.vendor.com/cgi-bin/buy/<productID00357>

In this example, "vendor.com" establishes the domain relative to any client side cookies stored by the client system 12 while the path component "cgi-bin/buy" establishes a base cookie path sufficient to uniquely identify a cookie in combination with the provided domain. The "<productID00357>" information provides the CGI program with the required identification of the product selected for purchase.

A second URL form may be used to permit the implementation of the present invention directly within a modified version of the HTTPd server application as executed by the server system 16. This second form may be exemplary constructed as follows [please correct this one also]:

https://www.vendor.com/catalog/buy/purchase?<productID00357>

Again, for purposes of identifying a client side stored cookie, the "vendor.com" domain and the "catalog/buy" path component are sufficient to uniquely identify a cookie. Preferably, the key word "purchase" is recognized by the HTTPd server application as specifying performance of the secure purchase transaction in accordance with the present invention with respect to the specified "<productID00357>".

Implementation of the present invention through a CGI program external to at least an otherwise conventional HTTPd server application or as a direct internal modification of a generally conventional HTTPd server application does not alter the basic method of performing the present invention. However, each approach to implementation has distinct trade-offs. Execution of external CGI programs can increase the effective load handled by the server system 16. However, the CGI program is typically portable among any particular implementation of the HTTPd server application, assuming the server natively supports for the secure socket layer or an equivalent.

Conversely, the internal implementation of the present invention involves source code level modifications to the HTTPd server application. Where the HTTPd server application is already subject to modification, such as for the implementation of autonomous URL redirection, the additional modifications needed to implement the present invention do not add significant complexity. In addition, the internal implementation of the present invention will be significantly if not substantially more efficient as compared to requiring the separate loading and execution of an external CGI program in order to carry out the present invention.

Independent of whether the secure purchase algorithm of the present invention is implemented as an external CGI program or internal modification of the server application itself, the initial substantive action by the HTTPd server application is to determine whether a URL received in a secure transaction with a client browser references a purchasable product 64. The initial parsing of the URL by the HTTPd server application will determine whether a secure purchase transaction CGI program is to be executed by the HTTPd server or whether the "purchase" key word is embedded in the URL. Where neither effective product reference exists in the URL, the URL is further processed by the HTTPd server application in a conventional manner typically for the purpose of serving a Web page to the client browser 66.

Where a product is referenced by the URL, a determination is then made as to whether a cookie is provided as part of the HTTP message providing the received URL 68. Where no cookie is associated with the URL, the submission of the URL is taken to imply a request to establish a purchasing arrangement with the vendor server. Thus, the server system 16 replies to the URL by returning a new account form to the client browser 70. This form may request whatever information is deemed appropriate by the vendor in order to establish an open purchase arrangement with the vendor. Typically, the information requested includes a name, password, credit card number, type of credit card, expiration date, and credit card billing address.

Once the client user has filled out the form, the client browser submits the form contents to the server system 16 for evaluation 72. The information provided by the client user may be automatically verified with the applicable credit card issuer or agent 74 to determine whether a valid account may be established for the client user. Should this credit check fail, the server system 16 preferably provides a form response to the client browser refusing the purchase transaction 76. Where the credit check succeeds, the server system 16 preferably opens a new account record for the client user 78. In addition, the server system 16 creates an initial cookie that encodes at least a client user identification code (ID) and the password submitted in connection with the new account form 72.

In an alternate preferred embodiment of the present invention, the cookie generated 78 not only encodes a client user ID and password, but also encodes other identifying information that is sent by the client browser as part of the URL request message. Encoding this additional information can serve to uniquely or at least substantially associate the cookie with a specific combination of the client browser and client system 12. In addition, the cookie may be further encrypted utilizing any conventional private key encryption algorithm. The private key and other information utilized in the construction of the cookie is stored with the account record for the client user. The substantive contents of the cookie is not decodable anywhere outside of the server system 16. Consequently, copies of the cookies as stored by the client system 12 are essentially non-portable among other possible client systems or modifiable to allow client user impersonation.

Where a cookie is provided 68 with the URL request issued by the client browser, the cookie is utilized to perform a database look-up to identify a client user account record. Regardless of whether the cookie has been encrypted, the cookie data can be utilized as the account reference for performing the database look-up of a client user record. The cookie data can then be validated against the information present in the account record. Where the cookie has been encrypted, the cookie can be decrypted utilizing the private key present in the account record and then validated against not only the other information stored within the account record but also present identifying information received directly from the client browser as part of the current HTTP transaction.

Where the cookies is determined invalid to due a failure to locate a current and valid account record corresponding to the cookie or in authenticating the cookie, a new account form can be provided to the client browser to establish or re-establish a credit relationship between the client user and vendor.

Where an account record is found and the cookie is authenticated 80, or where a new account has been successfully created 78, the server system 16 preferably then sends a confirmation form to the client browser 82. A new cookie, generated either in connection with the creation of an account record 78 or, where the cookie encodes a generational identifier that inherently changes over time and is potentially sequence specific, following validation of the received cookie 80, is provided by the server system 16 to the client browser in connection with the return of the confirmation form to the client browser. Even if a new cookie is not generated, a cookie is nonetheless preferably still set through an HTTP response to the client browser to update the expiration date associated with the cookie as held by the client browser. In all events, the cookie is marked secure.

In response, the client browser preferably displays the confirmation form on the client system 12 while recording the new or updated cookie in the client side storage provided by the client browser application 84. In a preferred embodiment of the present invention, the confirmation form provides an order summary sufficient to permit the client user to determine whether to confirm or cancel the order. The client user completes and submits the form by selecting either to accept or cancel the order 86. Where, in an alternate embodiment, the confirmation form provides for accepting, cancelling and deferring purchase of individual products summarized on the confirmation form, the client user completes these choices prior to submitting the form as accepted as annotated or cancelled in its entirety. Assuming that the order is confirmed or at least accepted as annotated, the server operates from the confirmation data provided by the submitted form to update the client user's account record 87 and process the order generally in a conventional manner to provide for the delivery of the selected product to the client user 88.

Figure 4:
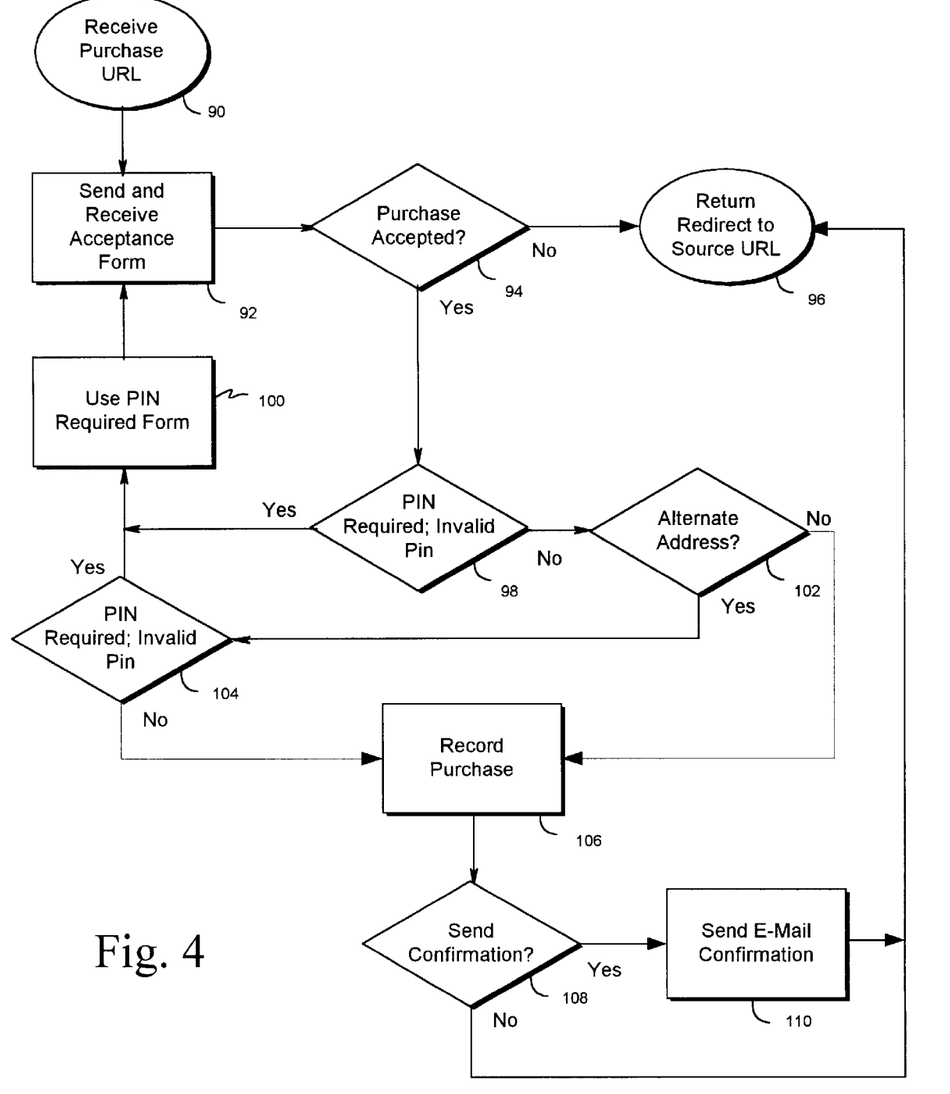
FIG. 4 is a flow diagram of the process of confirming a client purchase subject to optional authentication and security provisions.

A number of additional authentication and security options can be readily added on a server by server basis to the purchase process shown in FIG. 3. A server process specific to the acceptance phase of the purchase process is shown in FIG. 4. Following from the receipt 90 of a client purchase URL request, the confirmation/purchase acceptance form is returned 92 to the client. When the form captured data is submitted back to the server, a first determination is made 94 as to whether the purchase has been confirmed. If not accepted by the client, a redirection message is provided 96 back to the client. Preferably, the second purchase request URL itself is coded to include a redirection URL that specifies where the client is to be directed on conclusion of the purchase transaction. Preferably, the second URL points back to the Web page from which the purchase selection was made in order to provide continuity to the client session. Alternately, the server can examine the "Referred by" data automatically provided by the client on placing a URL request. This data specifies the source URL of the Web page from which the present URL request was made. Again, the source URL is provided back 96 to the client as part of a redirection message to maintain the esthetic continuity of the purchase transaction.

Where a purchase acceptance 94 has been provided by the client user through the confirmation form, an optional PIN for the identified client user may be checked and verified against the client record maintained by the server system. If a PIN is required by a specific server for all purchases, in order to provide a greater degree of authentication by the server, but is either invalid or incorrect, the a modified confirmation form 100 may be provided 92 to the client system indicating the need for a valid PIN in order to confirm the client user's order. If the basic acceptance of an order does not require a PIN or a valid PIN was entered, the ship-to address presented by the confirmation form is checked to verify that the address corresponds to the client user's credit card billing address, which is presented preferably as the default ship-to address. Where there is no change 102 to the ship-to address, the purchase request is recorded 106. If the address is changed, a PIN is preferably required to additionally authenticate the client user. Again, the modified confirmation form 100 is preferably sent if a PIN was not provided or was found to be invalid. When a valid PIN is received with the confirmation form, the purchase and alternate ship-to address are again recorded 106.

An optional confirmation of a purchase can be automatically sent by standard postal service to the credit card billing address of the client user or, preferably, by email to the email address provided when the credit relationship with the server vendor was established. The determination of when to send a confirmation 108 can be made subject to the dollar amount of the purchase, the client user's purchase history, or other criteria selected by the server vendor. After an email or standard mail confirmation of the purchase has been logically, if not actually, prepared and sent 100, or if no confirmation is to be provided, a redirection message is again sent 96 to the client to enable a seamless continuation of the purchase transaction from the perspective of the client user.

Thus, a system and method for providing secure, convenient and efficient purchase transactions to be executed over the Internet has been described. The system and method incorporate a substantial degree of flexibility allowing a product or service to be purchased with no more than two required mouse clicks where a credit relationship has been pre-established between a client user and vendor. The flexibility afforded by the present invention in performing purchase transaction extends also to allowing vendors to operate as catalog servers, URL sponsors, proxies for other servers providing purchasable products and services, and to provide purchase clearinghouse activities for the benefit of client users. Consequently, an efficient and convenient system for facilitating purchases over the Internet while maintaining an extremely high degree of security over sensitive information has been described.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

I claim:

1. A method of performing a purchase transaction between a client browser and a merchant server over a general purpose computer network comprising the steps of:
   a) establishing a persistent predetermined coded identifier on a client browser corresponding to an account record stored by a merchant server;
   b) providing for the serving of a Web page including a predetermined URL identifying a purchasable product or service to said client browser, said predetermined URL including a reference to said persistent predetermined coded identifier;
   c) receiving said predetermined URL, including said persistent predetermined coded identifier, by said merchant server;
   d) validating said predetermined coded identifier against said account record; and
   e) recording the identity of said purchasable product or service as derived from said predetermined URL by said merchant server.

2. The method of claim 1 wherein said persistent predetermined identifier is encoded with information that allows secure selection of said persistent predetermined identifier in connection with a defined set of URLs including said predetermined URL.

3. A method of claim 2 wherein said persistent predetermined identifier is stored in a secure manner by said client browser and communicated to said merchant server only through a secure network communications transaction.

4. The method of claim 3 wherein said persistent predetermined identifier is stored in an encrypted state by said client browser and includes data specific to said client browser so as to secure said predetermined identifier to said client browser.

5. The method of claim 4 wherein said process includes the step of confirming with said client browser the purchase of said purchasable product or service.

6. A method of performing trans-Internet purchase transactions between client browsers and merchant vendors, said method comprising the steps of:
   a) providing for a predetermined Web page to be served to a client browser with said predetermined Web page identifying a purchasable item and including a corresponding purchase transaction URL;
   b) receiving said corresponding purchase transaction URL and predetermined persistent cookie data previously stored by a merchant vendor on said client browser where said predetermined persistent cookie data is selected by said corresponding purchase transaction URL;
   c) determining the identity of said purchasable item and from said corresponding purchase transaction URL; and
   d) securely authenticating said client browser based on said predetermined persistent cookie data.

7. The method of claim 6 further comprising the steps of:
   a) obtaining a confirmation from said client browser of the purchase selection of said purchasable item; and
   b) recording the confirmed purchase selection of said purchasable item.

8. The method of claim 7 further comprising the step of providing a redirection message to said client browser to cause a client request for said predetermined Web page to be issued by said client browser.

9. The method of claim 8 wherein said step of obtaining a confirmation from said client browser includes optionally obtaining a personal identification number and a ship-to address for said purchasable item.

10. The method of claim 9 further comprising the step of issuing an independent purchase transaction confirmation to an address previously stored by said merchant vendor.

11. A method of presenting an electronic catalogue of purchasable items to a client browser wherein at least one merchant vendor is represented in the electronic catalogue, said method comprising the steps of:
   a) serving a Web page of an electronic catalogue to a client browser, said Web page including identifications of a plurality of purchasable items, each one of said plurality of purchasable item having an associated URL embedded in said Web page;
   b) receiving, in response to a single client browser selection, a predetermined URL request from said client browser including predetermined client environment data including predetermined persistent cookie data specifically corresponding to said predetermined URL;
   c) validating said client browser and identifying a predetermined one of said plurality of purchasable items from said predetermined URL; and
   d) serving a confirmation form to said client browser that requires a maximum of a single selection to accept and conclude the purchase of said predetermined one of said plurality of purchasable items.

12. The method of claim 11 wherein the Web page server is or is acting as an agent or proxy for a merchant vendor, said method further comprising the steps of:

a) identifying said client browser as representing a new account with respect to a merchant vendor;

b) establishing a credit relationship with said client browser on half of said merchant vendor; and c) storing predetermined persistent cookie data, encoded to identify said client browser to said merchant vendor, on said client browser.

13. The method of claim 12 further comprising the steps of:

a) determining from said predetermined URL request or said predetermined client environment data an identification of said Web page; and b) providing a redirection message including said identification of said Web page to said client browser following the step of serving said confirmation form to said client browser.

14. The method of claim 13 wherein said confirmation form permits entry of additional data, said method further comprising the steps of:

a) accepting an shipping address for said predetermined one of said plurality of purchasable items; and b) requiring entry of a personal identification number to extend authentication to a user of said client browswer.

15. The method of claim 14 wherein said step of establishing a credit relationship with said client browser includes identification of an email address of said user of said client browser, said method further comprising the step of issuing an email confirmation of a purchase made by said client browser to said email address of said user.

16. A method of enabling purchase transactions for individual items from a plurality of merchant vendors through a common Web page, said method comprising the steps of:

a) embedding a first URL, associated with a purchasable item, in a Web page that is served from a first server to a client browser, said first URL referencing a second server;

b) providing for the storage of first persistent cookie data by said client browser and of a first database record by said second server, said first persistent cookie data corresponding to said first database record as stored by said second server;

c) receiving by said second server a first URL request corresponding to the client browser selection of said first URL;

d) receiving by said second server said first persistent cookie data;

e) validating said first persistent cookie data against said first database record;

f) identifying said purchasable item from said first URL request;

g) obtaining confirmation of the purchase of said purchasable item from said client browser; and h) providing for said client browser to issue a second URL request to said first server to be served with said Web page.

17. The method of claim 16 wherein said first and second servers are the same server.

18. The method of claim 16 further comprising the steps of:

a) said second server providing a third URL request to a third server;

b) providing for the storage of second persistent cookie data by said second server and of a second database record by said third server, said second persistent cookie data corresponding to said second database record as stored by said third server;

c) receiving by said third server said third URL request;

d) receiving by said third server said second persistent cookie data;

e) validating said second persistent cookie data against said second database record;

f) identifying by said third server said purchasable item from said third URL request; and g) obtaining confirmation of the purchase of said purchasable item from said second server.

19. The method of claim 18 wherein said step of obtaining confirmation of the purchase of said purchasable item from said second server includes said second server providing a ship-to address obtained from said client browser, said first database record, or said second server for the shipment of said purchasable item.

20. The method of claim 19 wherein said step of obtaining confirmation of the purchase of said purchasable item from said second server includes said client browser providing a personal identification number to said second server to authenticate the user of said client browser.

21. The method of claim 20 wherein said step of providing for said client browser to issue a second URL request to said first server includes providing new first persistent cookie data to said client browser for storage, said second server storing a new first database record corresponding to said new first persistent cookie data.

22. The method of claim 21 wherein at least a part of said first persistent cookie data and said new first persistent cookie data is encrypted and wherein a corresponding decryption key is stored in said first database record and said second database record.

* * * * *